Dec. 29, 1959    A. S. PORTNER    2,918,749
CRAB TRAP CONSTRUCTION
Filed Dec. 28, 1956

INVENTOR:
ALBERT S. PORTNER
BY Howson & Howson
ATTYS.

United States Patent Office 2,918,749
Patented Dec. 29, 1959

2,918,749

CRAB TRAP CONSTRUCTION

Albert S. Portner, Vineland, N.J.

Application December 28, 1956, Serial No. 631,269

1 Claim. (Cl. 43—102)

The present invention relates to new and useful improvements in trap constructions and more particularly to the construction of a crab trap having a novel bait holder adapted to securely hold bait in position in the trap.

The present invention is directed particularly to traps for crabs and other types of crustaceans and is formed entirely of wire mesh. The trap has swinging side wall members pivoted to the base which normally are maintained in a closed position but may be released to lie flat when the trap is resting on the bed of a body of water. Crabs and other crustaceans are attracted to traps of this type by the bait in the trap but normally will not remain in the trap to eat the bait; instead, entering the trap to grab the bait and then attempting to remove the bait from the trap and carry it to some secluded spot in order to eat the bait. In addition, with conventional traps of this type, when the trap is not resting on a perfectly horizontal surface one or more doors or swinging side walls of the trap will not open.

With the foregoing in mind, the principal object of the present invention is to provide a novel crab trap wherein means are provided to securely hold the bait in the trap.

Another object of the present invention is to provide a novel crab trap having outwardly swinging side wall portions which will readily open when the trap is in use.

A further object of the present invention is to provide a novel crab trap wherein the bait holding mechanism is readily releasable to permit the user of the trap to easily remove the bait therefrom and also rapidly insert bait into the trap.

A still further object of the present invention is to provide a novel crab trap having the features and characteristics set forth above which is of relatively simplified construction, may be manufactured easily and cheaply, and is highly efficient and effective in operation and use.

These and other objects of the present invention and the various features and details of the operation and construction hereof are hereinafter more fully set forth and described with reference to the accompanying drawings, in which.

Figure 1:
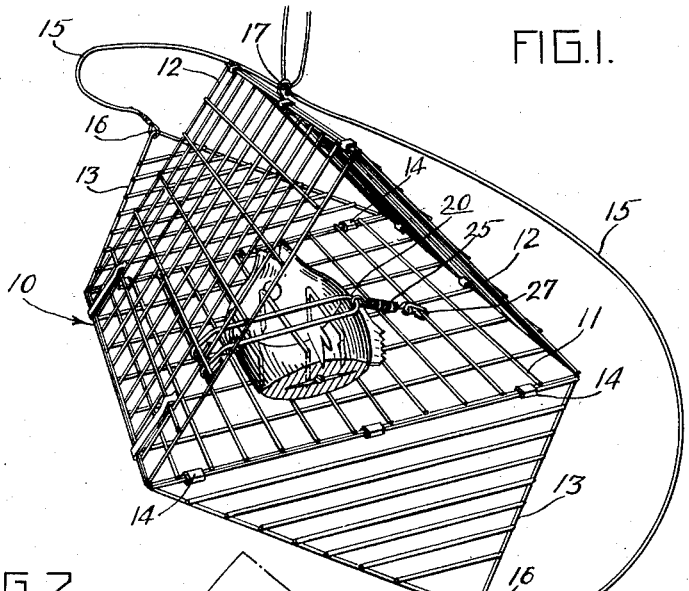
Fig. 1 is a perspective view of a crab trap made in accordance with the present invention.

Referring more specifically to the drawings, reference numeral 10 designates generally a crab trap made in accordance with the present invention comprising a generally rectangular base or bottom wall 11 and a pair of side walls 12, 12 secured to the base 11 along the opposite side edges thereof and converging inwardly and secured to each other at the top of the trap to provide a trap having a generally triangular shape in transverse cross section. A pair of triangular end walls 13, 13 are pivotally secured to the opposite end of the base 11 for example, by means of clips as indicated at 14.

Each of the bottom, side and end walls are formed of wire mesh or the like consisting, in the illustrated embodiment of the present invention, of a plurality of wires extending substantially at right angles to each other and secured together, for example, by means of welding or soldering. The end walls 13, 13 are adapted to be moved from a vertical position wherein they completely close the opposite ends of the trap and a horizontal position wherein the ends of the trap are open permitting crabs to enter the trap. The end walls 13, 13 are held in the closed position when the trap is not resting on its bottom by means of a pair of flexible lines 15, 15 secured to the outer ends of the end walls as indicated at 16, 16. An eye 17 is secured to the mid-point of the upper ends of the side walls 12, 12 through which the lines pass. When the trap is supported by the lines 15, 15 the end walls are maintained in the closed position and alternatively when the trap is resting on its base and the lines are permitted to slacken the end walls 13, 13 drop downwardly to the position illustrated in Fig. 1.

In order to insure positive opening of the end walls 13, 13 when the trap is lying on the bed of a body of water the end walls 13, 13 diverge outwardly and upwardly away from one another when they are in the closed position. By this construction, the force of gravity will cause the end walls 13, 13 to open when the trap is lying on a surface which is not quite horizontal.

Figure 2:
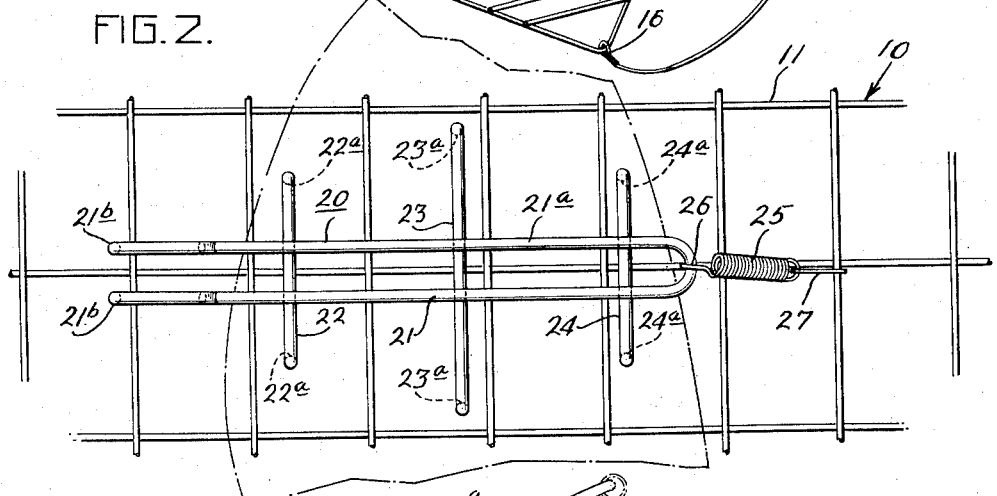
Fig. 2 is an enlarged fragmentary plan view of a portion of the base of the trap of Fig. 1 illustrating the bait holder.
Figure 3:
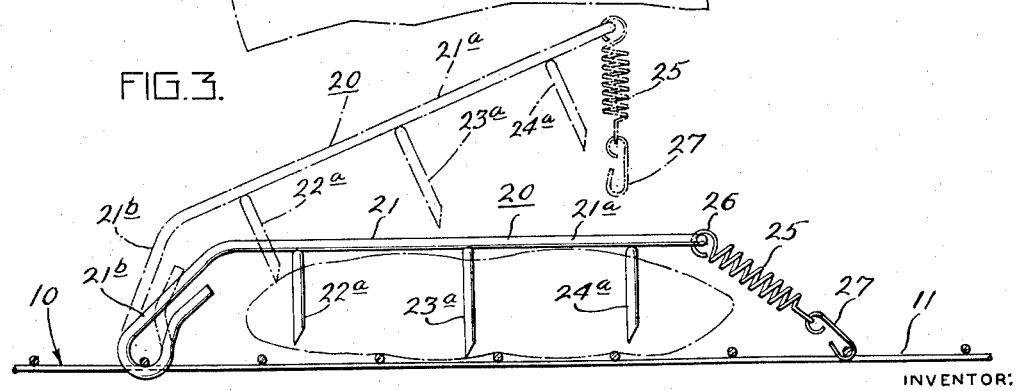
Fig. 3 is an enlarged side elevational view partially in section of the base and bait holder illustrated in Fig. 2.

The principal feature of the present invention is the provision of means to securely hold the bait in the trap. To this end, a bait holder, designated generally as 20, is fastened to the bottom wall of the trap as illustrated in Figs. 2 and 3. The bait holder comprises an elongated U-shaped frame portion 21 formed, for example, of a continuous length of wire having an elongated body portion 21a disposed in generally parallel relation with the bottom wall of the trap and terminating in downwardly extending free end portions 21b, 21b reversely bent upon themselves to form hook portions adapted to fit over one of the wires of the bottom wall of the trap. The hook portions are not completely closed, as illustrated in Fig. 3, so that the bait holder may be removed from the trap. A plurality of bait holding members 22, 23 and 24 formed of rounded wire stock extend transversely of the frame portion 21 at spaced intervals along the elongated body portion of the frame and are affixed thereto, for example, by means of welding or soldering. The bait holding members 22, 23 and 24 each terminate at the opposite ends thereof in downwardly extending prongs or sharpened points 22a, 23a and 24a respectively, which are adapted to either pierce or encircle the bait, depending on the size of the bait, when the bait holder is locked in position.

In accordance with the present invention, the bait holder is resiliently secured in its locked position by means of a coil spring 25 which has one end thereof fixed to the body portion of the bait holder, at the end of the body portion opposite the hook portions, as indicated at 26. The other end of the spring member 25 is secured to a hook member 27 which may readily be fastened over one of the transverse wires of the bottom portion of the trap. In order to use the bait holder of the present invention, the bait holder is raised to the elevated position, as illustrated in broken lines in Fig. 3, and a piece of bait is positioned on the bottom wall of the trap beneath the bait holder. The bait holder is then forced downwardly to the position shown in full lines in Fig. 3 wherein the prongs either pierce the bait or surround the bait depending on the size of the bait. The spring 25 is then stretched and the hook member 27 is fastened over one of the wires of the base of the trap to maintain the spring under tension. This resiliently maintains the bait holder in its downward or locked position thereby securely holding the bait in the trap. When it is desired to remove the bait from the trap the hook member 27 is merely disengaged from the bottom wall of the trap and the bait holder 20 is raised to its elevated position.

From the foregoing, it will be apparent that the present invention provides a novel trap construction having a novel bait holder therein which will securely maintain a piece of bait in the desired position on the bottom of the trap and prevent the bait from being removed from the trap by a crab or other crustacean. In addition, it will be apparent that the present invention provides a novel trap construction having the features set forth above which is of relatively simplified construction and which insures positive opening of the end walls of the trap.

While a particular embodiment of the present invention is illustrated and described herein, it is not intended to limit the invention to such a disclosure and changes and modifications may be incorporated and embodied therein within the scope of the following claim.

I claim:

In a crab trap or the like having a wire mesh base portion consisting of a plurality of spaced inter-connected cross wires and side and end walls with at least one of said walls adapted to be opened to permit entrance to the trap, a bait holder pivotally and selectively secured to one of said cross wires of said trap base portion, said bait holder comprising a continuous length of wire reversely bent upon itself to form an elongated U-shaped body portion, said wire terminating in spaced parallel downwardly extending free end portions, each of said free end portions being reversely bent upon itself and forming a circular loop portion, the terminal ends of said free end portions terminating adjacent said downwardly extending portions of the wire and spaced therefrom a distance greater than the diameter of said cross wires to permit said loop portions to be removably positioned over said cross wires, said loop portions pivotally mounting said bait holder in said trap for movement between upper and lower limit positions, a plurality of cross members secured to said body portion extending transversely thereof and terminating in downwardly projecting prong portions adapted to engage the bait and secure the bait in said trap when said body portion is in said lower limit position, a resilient spring member in engagement with the end of said body portion opposite said loop portions, and a fastening member in engagement with said spring member and operable to selectively engage one of said cross wires of said trap base portion whereby said body portion is resiliently maintained in said lower limit position.

References Cited in the file of this patent
UNITED STATES PATENTS

| | | |
|---|---|---|
| 2,059,582 | Hurewitz | Nov. 3, 1936 |
| 2,531,546 | Anderson | Nov. 28, 1950 |
| 2,603,030 | Pape | July 15, 1952 |